United States Patent [19]
Linkner, Jr.

[11] Patent Number: 5,468,058
[45] Date of Patent: Nov. 21, 1995

[54] ANTILOCK SYSTEM WITH PROPORTIONAL CONTROL AND PRESSURE MEMORY

[75] Inventor: Herbert L. Linkner, Jr., Dexter, Mich.

[73] Assignee: Kelsey-Hayes Company, Livonia, Mich.

[21] Appl. No.: 404,022

[22] Filed: Mar. 14, 1995

[51] Int. Cl.⁶ ........................................................ B60T 8/32
[52] U.S. Cl. ...................................... 303/115.2; 303/113.2
[58] Field of Search .............................. 303/115.2, 115.1, 303/113.2, 113.1, 100; 364/426.01, 426.02, 426.03

[56] References Cited

U.S. PATENT DOCUMENTS

5,112,116  5/1992  Boules et al. .......................... 303/115.2

Primary Examiner—Douglas C. Butler
Attorney, Agent, or Firm—Brooks & Kushman

[57] ABSTRACT

An antilock brake system for an automotive vehicle having a master brake cylinder and wheel brakes hydraulically connected to the master brake cylinder during normal vehicle braking including a power cylinder having an adjustable piston, an electric motor connected drivably to the piston through a selectively enagageable electromagnetic clutch, a solenoid operated valve situated in fluid communication with the wheel brakes and adapted to connect the master brake cylinder to the wheel brakes for a normal braking action and for isolating the master cylinder from the wheel brakes and connecting the wheel brakes to the power cylinder for antilock cycling of the wheel brakes, and an electronic controller and wheel speed sensors for detecting wheel slip whereby the controller triggers the operation of the solenoid valve to isolate the master cylinder from the brakes and to dump pressurized fluid from the brakes when a threshold wheel slip is detected, the clutch being disengaged during the pressure dumping stage of the antilock brake cycle as the motor drive circuit is closed whereby kinetic energy stored in a rotating motor armature may be used in a subsequent brake reapply stage of the antilock brake cycle.

12 Claims, 8 Drawing Sheets

ANTILOCK SYSTEM WITH PROPORTIONAL CONTROL AND PRESSURE MEMORY

TECHNICAL FIELD

The invention relates to antilock brake systems for automotive vehicles whereby a controlled wheel slip is achieved to reduce vehicle stopping distance.

BACKGROUND OF THE INVENTION

Antilock brake systems used in wheeled vehicles typically use relatively complex digital logic control modules in a hydraulic valve system for pressure operated wheel brakes. These antilock brake systems receive wheel speed signals from speed sensors at the wheels and analyze wheel speed behavior. The logic module is capable of determining the extent of wheel slip using the input wheel speed data.

An electronic control signal is delivered to a solenoid valve network in such systems to adjust wheel brake pressure. A wheel brake pressure dump valve and a wheel brake pressure apply valve respond to brake signals developed by the digital logic module as they are sequentially actuated. In this way, the brakes are intermittently applied and released to avoid continued locking of the wheels and to maintain the tire/road surface interface slip ratio at a desired value.

The effective coefficient of friction that exists at the tire/road surface interface will vary depending on the type and condition of the road surface and the type and condition of the tires. The coefficient of friction increases in direct proportion to the slip ratio before the effective friction coefficient at the tire/road interface reaches a maximum value. When the slip ratio exceeds a predetermined slip ratio value, the relationship between slip ratio and effective coefficient of friction reverses as the effective friction coefficient decreases.

The lateral stability of the vehicle due to slip at the tire/road surface interface also changes according to the slip ratio. Lateral stability is maintained at an acceptable level, however, if the controller achieves a slip ratio in the vicinity of the range of slip ratios where the coefficient of friction is at or near its maximum value.

In such prior art systems, pressure control solenoid valves basically achieve a dump of brake pressure or a hold brake pressure at a constant value or reapply brake pressure, but there is no control of the rate of pressure buildup at the brakes nor a control of the pressure level. Such systems also lack a means for obtaining feedback information that would determine brake pressures or pressure buildup rates for improved control and reduced braking distance and lateral control of the vehicle.

BRIEF DESCRIPTION OF THE INVENTION

The improved antilock brake system of the present invention provides for control of brake pressure levels as well as brake pressure buildup rate when the antilock brake system is triggered in response to the detection of an incipient wheel slip. The improved antilock brake system further provides for an electrical feedback of actual pressure levels and rates of pressure buildup. Both the pressure levels and the rate of pressure buildup are stored in memory during the antilock brake mode that occurs once the master brake cylinder is isolated hydraulically from the wheel brakes.

The control system will achieve improved antilock braking by monitoring, controlling and memorizing the kinetic energy of the movable elements of the system and providing a proportional antilock brake pressure buildup during the brake reapply portion of the antilock brake cycle.

Each wheel brake circuit of the proposed system comprises a master cylinder and a proportional power cylinder assembly connected by means of a three-way solenoid valve to the brakes of the vehicle. During normal braking, the solenoid is de-energized and the master brake cylinder controls brake application and release. During operation in the antilock braking mode, the solenoid is energized and the power cylinder controls brake pressure release and reapplication. The power cylinder assembly comprises an electric motor that is connected drivably to a power piston by means of a normally disengaged electric clutch and a low friction ball screw drive mechanism for the piston. The drive mechanism moves the piston for the power cylinder assembly to control brake pressure during the antilock operating mode. The ball screw drive mechanism has high mechanical efficiency and is used during a pressure dumping mode of the braking cycle to cause brake pressure to decrease without electric motor power input.

The brake pressure and the wheel brakes during the brake pressure dumping portion of the brake cycle back-drives the power piston. The mass moment of inertia of the ball screw and the output rotary elements of the clutch is low compared to the overall mass moment of inertia of the mechanical drive and motor armature. This facilitates rapid acceleration of the mechanical components associated with the piston thereby providing a fast pressure dumping rate.

During the pressure dumping portion of the cycle, the input rotary mass of the clutch and the mass of the motor are accelerated by applying voltage to the motor. The magnitude of the motor voltage is stored in the memory of the antilock brake controller. When the wheels accelerate to an acceptable slip level, the clutch is reapplied. The kinetic energy of the rotating armature of the motor and the clutch flywheel mass is converted into a fast pressure increase rate to a pressure level that is a function of the initial stored energy level.

The controller will monitor the rate of pressure buildup in the wheel brakes. The stored kinetic energy of the rotating mass during the dump portion of the brake cycle is consumed by the work necessary to effect a brake pressure rise. When the pressure rise rate decreases to desired value, voltage again will be applied to the motor to maintain a desired slower pressure rise rate.

The rate of change in the motor speed during the open-circuit, fast-reapply portion of the antilock cycle is proportional to the mass moment of inertia of the motor armature and input rotary mass of the clutch. The rate of change in the motor speed also is proportional to the moment on the motor, which in turn is a function of the pressure, which in turn is a function of the closed circuit voltage used to drive the motor during the dump portion of the cycle. The change in the motor open circuit voltage at the end of the last proportional reapply portion of the cycle can be divided by the time increment and multiplied by physical parameter constants to determine the brake pressure at that point and to determine the voltage needed to drive the motor against that pressure at the desired speed.

In a preferred embodiment of the invention, the motor voltage is a voltage obtained from the vehicle voltage source which is part of the vehicle's electrical system. Thus, the antilock brake module output is duty cycled to provide various effective voltages that would be needed by the motor and the clutch.

The improved control system provides a proportional reapply antilock cycle which includes a fast pressure dumping followed by a quick pressure buildup in the wheel brakes to a value of approximately 80% of the pressure that would produce incipient lockup on a previous cycle. This quick pressure buildup then is followed by a slow pressure reapplication. This slow pressure rise rate also is a function of the pressure that would produce incipient lockup during the previous cycle. For low previous cycle lockup pressures, the slow reapply rate would be low. For high previous cycle lockup pressures, the slow reapply rate would be made higher by applying a higher controlled voltage duty cycle to the motor during this portion of the antilock cycle. This results in a relatively high average pressure during the braking mode thereby reducing stopping distance while maintaining good vehicle stability and steerability.

If the dump portion of the cycle is triggered when the slow apply mode has lasted for a predetermined time, no change in motor memory voltage and energy storage for the motor would be required. On the other hand, if the slow reapply mode extends past a predetermined time limit, that may indicate that the vehicle has moved to a surface with a higher coefficient of friction or that the motor memory voltage of the previous cycle was too low. This will trigger a motor voltage increase to achieve a higher brake pressure increase rate and the motor memory voltage will be incremented by a fixed amount. If the cycle is slightly shorter than intended, the motor memory voltage then is decremented by a fixed amount and that new memory voltage is used in subsequent cycles. The motor memory voltage can be decremented by a further amount if the slower reapply mode has lasted less than a second maximum time limit.

BRIEF DESCRIPTION OF THE DRAWINGS

FIG. 2b is a top view of the wheel shown in FIG. 2a;

FIG. 6b is a plot of wheel brake pressure versus time during the antilock braking cycle together with a trace of the current that corresponds to the motor-driven applied PWM voltage of FIG. 6a;

FIG. 6d is a test trace corresponding to FIG. 6b showing brake pressures versus time during an antilock cycle wherein the maximum brake pressures are low compared to the brake pressures indicated in FIG. 6b;

FIG. 7 is a plot of the relationship between braking pressure and the inertia energy of an electric motor that may be used in the braking system of FIG. 4a;

PARTICULAR DESCRIPTION OF THE INVENTION

Figure 4:
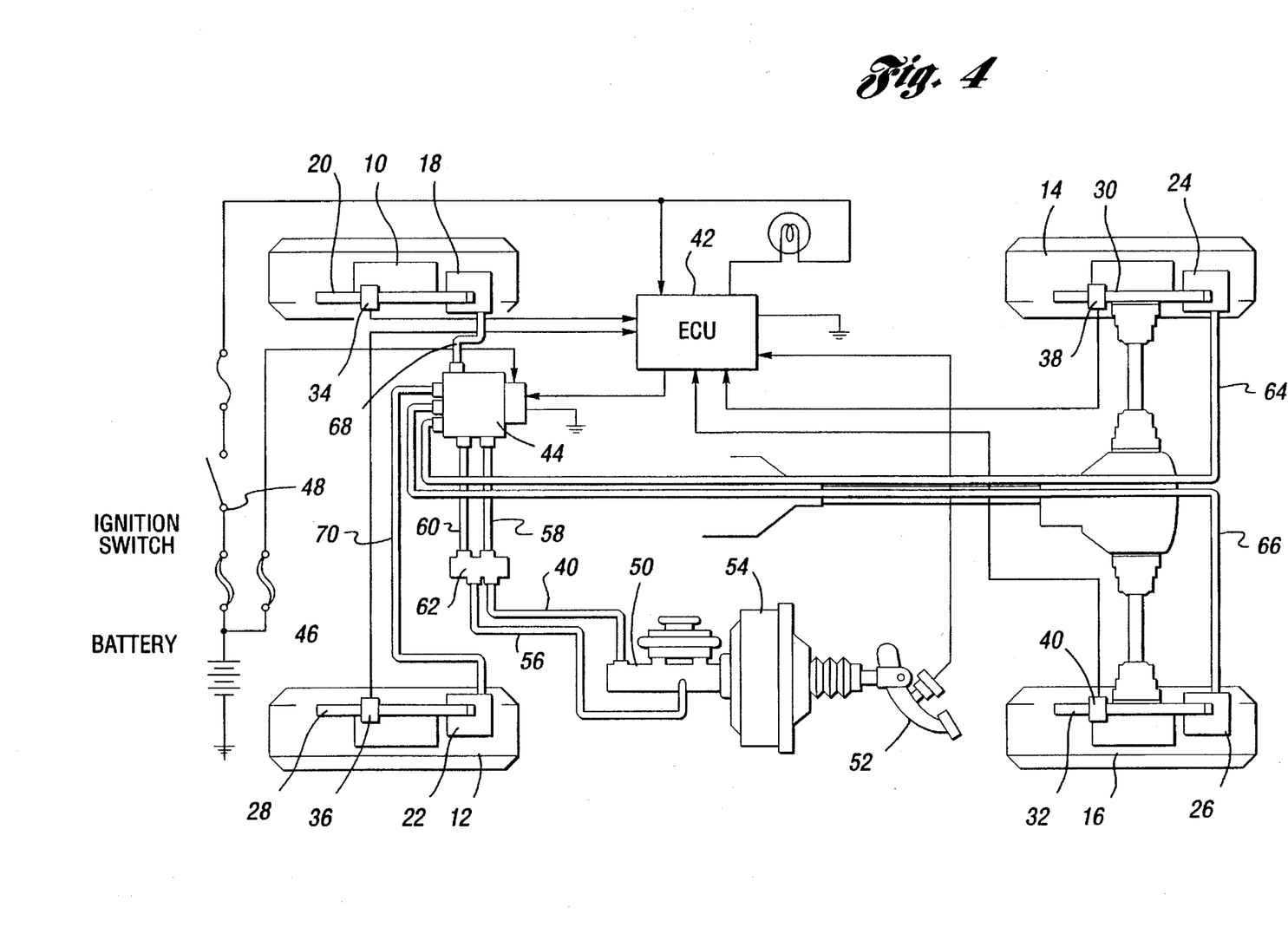
FIG. 4 is a schematic representation of an antilock brake system for an automotive vehicle.

In the diagram of FIG. 4, the front vehicle wheels are shown at 10 and 12. The rear vehicle road wheels are shown at 14 and 16. Each wheel has a disk brake assembly comprising a brake actuator indicated at 18 and a brake disk as indicated at 20 for the road wheel 10. Corresponding wheel brake actuators 22, 24 and 26 are provided for the wheel brakes 12, 14 and 16, respectively. The wheel brake discs for the wheels 12, 14 and 16 are shown, respectively, at 28, 30 and 32.

Figure 5:
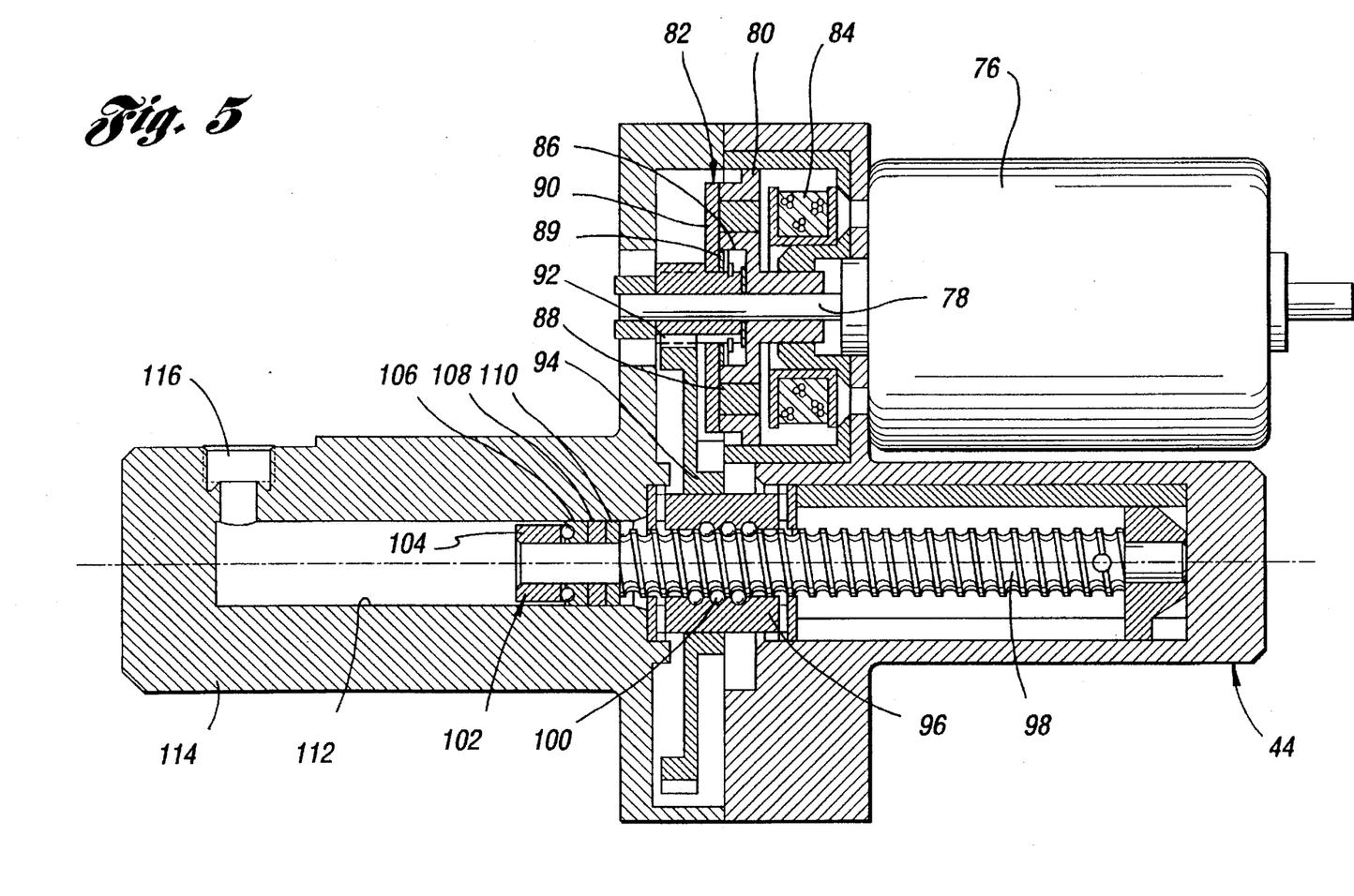
FIG. 5 is a cross-sectional view of the power cylinder and the motor drive mechanism for the power cylinder antilock brake system of FIG. 4.

Each wheel brake has a wheel speed sensor. The sensor for wheel 10, shown at 34, is arranged in close proximity to the disk 20. The corresponding wheel speed sensors for the wheels 12, 14 and 16 are shown at 36, 38 and 40, respectively. Each wheel speed sensor develops a speed signal that is received by a microcomputer having an electronic control unit and memory storage registers (ROM) for storing control instructions and algorithms that are addressed as wheel speed data and other operating data are acted upon by a CPU portion of the ECU. The microcomputer also has a RAM memory for storing monitored back GMF voltages of the motor during each background control loop of the electronic control unit. The memory registers for the voltage values are addressed and the instantaneous monitored voltage values are used in the pressure calculations as indicated at 42. A wheel brake actuator, which will be described subsequently with particular reference to FIG. 5, is shown at FIG. 4 at 44. The actuator includes a three-way solenoid valve under the control of microcomputer 42. The source of power for the microcomputer and the actuator 44 is the vehicle battery 46. The ignition switch 48 activates the brake system.

The wheel brake master cylinder assembly 50 is activated by the vehicle operator by applying a braking force to brake lever 52. The braking force is augmented by an engine intake manifold vacuum power boost mechanism 54, which is well known in the art.

Pressure is distributed from pressure supply passages 40 and 56 to the wheel brake actuator 44 through passages 58 and 60. Passages 40 and 56 are parts of two separate but equivalent brake pressure circuits that protect against brake system malfunctions. Valve 62 is a differential pressure valve that detects a difference in pressure between the separate brake circuits and lights an indicator light in response to a pressure difference.

Wheel brake pressure is distributed from the actuator 44 to each rear wheel brake through brake supply lines 64 and 66. Corresponding wheel brake pressure supply passages for the front brakes are shown at 68 and 70, respectively.

Figure 2A:
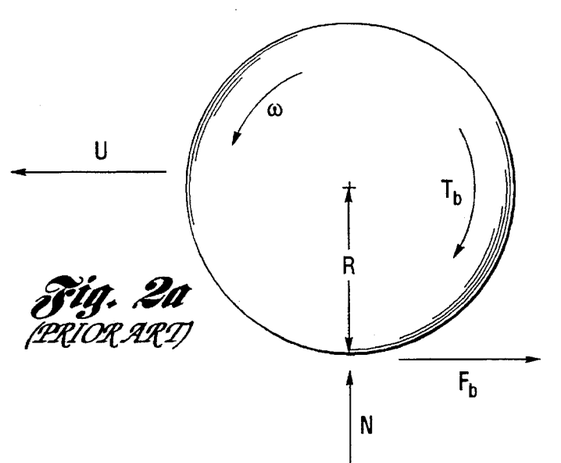
FIG. 2a is a diagrammatic vector drawing of a road wheel for a typical automotive vehicle where the forces acting on the wheel, the velocities and the braking torque are indicated by vectors.
Figure 2B:
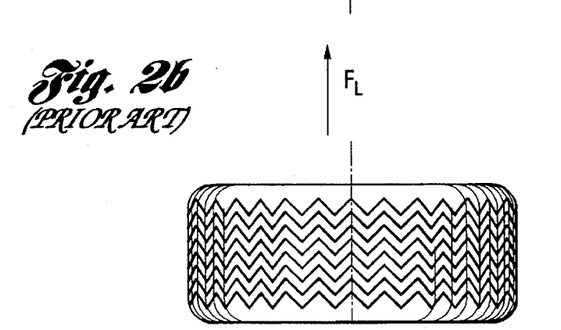

FIGS. 2a and 2b show the forces and the torques acting on the vehicle wheels. The vector U in FIG. 2a represents the vehicle speed. Vector ω represents the angular velocity of the wheels. The vehicle speed equals Rω where R is the tire rolling radius when the brakes are released.

When the brakes are applied, a braking torque $T_b$, shown in FIG. 2a, acts in opposition to the wheel motion. The actual force that decelerates the vehicle is shown at $F_b$ in FIG. 2a. The lateral force which maintains directional control of the vehicle is shown at $F_L$ in FIG. 2b.

When the wheel speed begins to decrease and to cause a difference in the tire speed relative to the vehicle speed U, tire slip may occur relative to the road surface. The amount of the slip (S) determines the braking force and the lateral force available. The slip as a percentage of the car speed is represented by the equation:

$$S = \frac{U - \omega R}{U} \times 100\%$$

Thus, a rolling tire has a percentage slip of zero and a fully locked tire has a percentage slip of 100%.

The braking force and the lateral force available on the tire are proportional to the normal force N, shown in FIG. 2a, which acts on the tire/road interface, and the friction coefficients for the braking force $F_B$ and the lateral force $F_L$, respectively.

Figure 3:
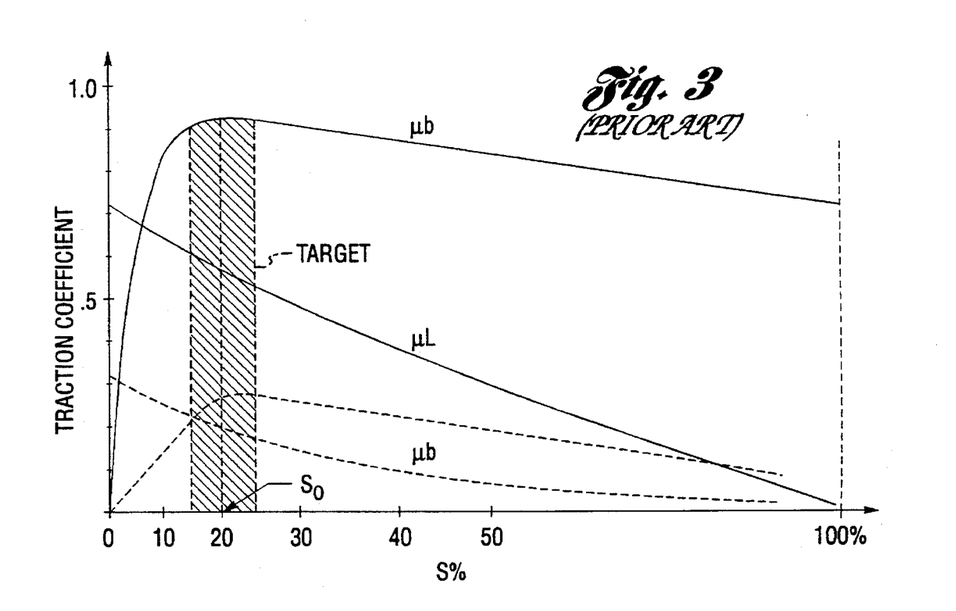
FIG. 3 is a plot of braking coefficients for a generic antilock brake system versus percentage of slip at the tire road interface.

The braking friction coefficient and the lateral friction coefficient vary significantly as the percent of slip changes. This relationship is shown in FIG. 3 where the braking friction coefficient is shown at $\mu_b$ and the lateral coefficient is shown at $\mu_L$. The braking pressure coefficient increases until a maximum value is obtained at approximately 15% to 25% of the percentage slip as shown on the abscissa of the plot of FIG. 3. Further increases in slip will decrease the braking friction coefficient. On the other hand, the lateral friction coefficient $\mu_L$ decreases steadily with an increasing percentage slip. The antilock brake system of the invention will make it possible to achieve the maximum braking coefficient within the so-called target slip zone indicated by a shaded area in FIG. 3 while maintaining substantial lateral friction coefficient to ensure lateral stability and good steering control.

It is an object of the present invention to maintain a braking characteristic that is within the shaded target slip zone indicated in FIG. 3 or which is slightly to the left of the indicated target slip zone and to avoid a condition in which the friction characteristic would fall to the right of the target slip zone.

The antilock brake system of the invention regulates brake pressure to maintain a controlled slip. This regulation occurs based upon an estimate of the torque applied to the road wheels by the braking force $F_b$. The braking torque that opposes the torque applied to the wheel is responsive to brake pressure and the difference between these two torques acts to decelerate the wheel. The torque of the wheel, $$\Sigma T_w = F_b R - T_b = I \dot{\omega}$$

where $I_\omega$ is the wheel moment of inertia and $\dot{\omega}$ is wheel deceleration; i.e. $d\omega/dt$.

Figure 1:
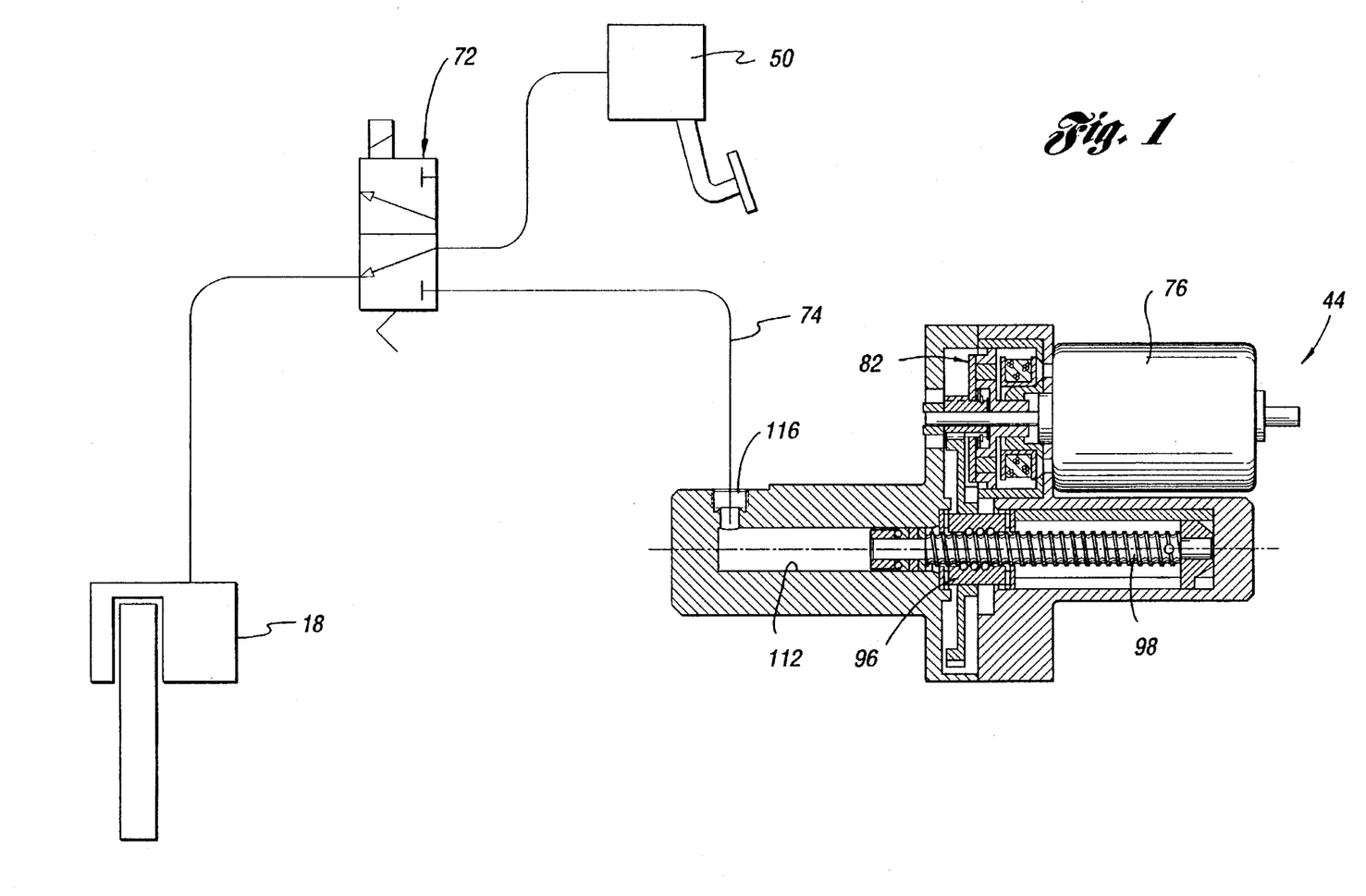
FIG. 1 is a schematic representation of an antilock brake system capable of embodying the improvements of the present invention.

FIG. 1 shows in schematic form the actuator 44. It comprises a three-way solenoid valve 72 which is actuated by a solenoid, not shown, which is capable of assuming each of two positions. As the solenoid for the three-way solenoid valve is energized and de-energized, the three-way solenoid valve 72, in the position shown, establishes fluid communication between master cylinder 50 and wheel brake 18 although it is capable of supplying pressure also to the companion wheel brakes indicated in FIG. 4. When the three-way solenoid valve 72 is energized, communication between the master brake cylinder and the wheel brake 18 is interrupted and communication is established between brake pressure passage 74 and the brake actuator 18. The brake actuator 44 will be described with reference to the cross-sectional view of FIG. 5.

As seen in FIG. 5, the actuator 44 comprises an electric motor 76 having an armature shaft 78 to which is drivably connected a drive plate 80 for electromagnetic clutch 82. The windings for the clutch 82 are shown at 84. The clutch rotor 86 is disposed in the magnetic flux field for the windings 84. It carries at strategic locations a non-magnetic aluminum alloy 88. A clutch disk 90 is situated adjacent the drive plate 80 and frictionally engages the plate 80 when the windings 84 are energized. The disk 90 slides axially on drive pinion 92 of a gear drive and is drivably connected to it. A wave spring 89 separates the disk from the plate 80 when the clutch is de-energized. Pinion 92 meshes with a driven gear 94 carried by a low friction, ball nut assembly 96. A ball screw 98 is disposed within the ball nut assembly. Low friction steel balls 100 establish a driving connection between the ball nut assembly and the ball screw.

A piston assembly 102 is carried at the operating end of the ball screw. It comprises a piston collar 104 and a piston seal 106 separated by an O-ring. A back-up ring 108 engages a piston washer 110 carried by the ball screw. This resists side loads.

A power cylinder 112 is located in cylinder wall 114. The left end of the cylinder 112 communicates with the brake pressure supply lines through high pressure port 116.

When the clutch 82 is energized, torque may be distributed from the motor 76 to the ball nut assembly 96 thereby driving ball screw 98 to the left thus increasing the antilock brake pressure in cylinder 112. When the clutch is de-energized, brake pressure in cylinder 112 will back-drive the ball nut assembly thereby retracting the piston assembly 102 and reducing the pressure in the wheel brakes. Thus, the power cylinder shown in FIG. 5 controls brake pressure release and reapplication during the antilock mode. This occurs, as explained previously, when the solenoid is energized and the master brake cylinder is isolated from the wheel brakes.

There are three operating modes that are used during the antilock cycle. These are a pressure dump mode, a fast reapply mode and a slow reapply mode. The dump mode occurs when the microcomputer, in response to wheel speed signals from the wheel speed sensors, detects an imminent wheel lockup. At that instant, the controller will cause the three-way solenoid valve to be energized thereby the isolating wheel brake actuators from the master cylinder and connecting the power cylinder to the wheel brakes.

At the beginning of the dump mode, the high efficiency ball screw drive mechanism back-drives the power cylinder. This causes a rapid decrease in brake pressure since the mass moment of inertia of the ball screw and the output clutch disk 90 is relatively low, thereby permitting their rapid acceleration.

During the dumping of the brake pressure, the motor and the input rotor mass of the clutch is being prepared for a subsequent brake pressure increase. This is done by applying a voltage to the motor, the magnitude of the voltage being a value stored in memory. That voltage is a permanent memory voltage that causes the motor and the input clutch masses to rotate and to store enough kinetic energy to produce a brake pressure of approximately 80% of the brake pressure that would lock up the controlled wheel.

Figure 9:
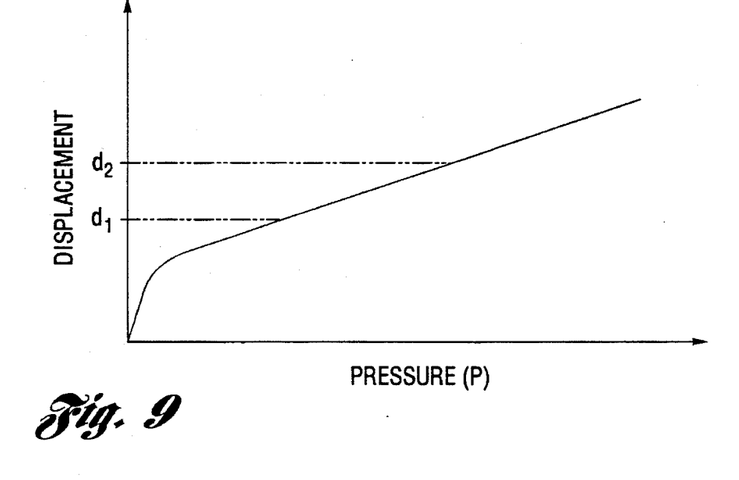
FIG. 9 is a plot of the relationship between voltage developed by the motor as a result of the kinetic energy stored in the rotating armature of the motor versus the pressure at the brakes resulting from deceleration of the armature during a fast apply portion of the antilock brake cycle.

In initially computing the magnitude of the permanent memory voltage during calibration of a particular brake system, the calibrater would have available to him the brake displacement versus pressure relationship, such as the relationship shown in FIG. 9 where displacement of the piston is indicated on the ordinate and the pressure is indicated on the abscissa. The energy that is needed to increase brake pressure from various pressure ranges during the antilock cycle then can be determined by integrating the pressure with respect to the brake displacement in the pressure range. This is represented analytically as work (W) as shown in the following equations:

where:

W=work

F=force $$W = \int F \, dx$$

F=PA dx=dV/A $$W = \int_{d_1}^{d_2} PAdV/A = \int_{d_1}^{d_2} PdV,$$

X=travel

P=pressure

A=area

V=displacement

Based upon the most common pressure cycles for any given application, the most likely work that would be needed for a subsequent pressure reapplication can be computed. That value can be stored as kinetic energy of the rotating armature of the motor and clutch flywheel assembly by applying a voltage to the motor during the dump cycle. The kinetic energy is represented by the following equation for work (W). Thus:

$$W = KE = \tfrac{1}{2}I\theta^2,$$

where:

KE=kinetic energy of the motor armature and the input rotary mass of the clutch

I=mass moment of inertia of the motor armature and the input rotary mass of the clutch θ=motor angular velocity The motor, being de-clutched, has no load on it during the dump mode. Thus, voltage alone can be used to control the terminal velocity of the motor and the energy stored in the rotating armature. This is represented as follows:

$$\theta = kv$$

$$W = \tfrac{1}{2}I(kv)^2,$$

where k=a constant v=voltage

When the wheels accelerate to acceptable slip levels, a high voltage would be applied to the clutch for approximately 10 milliseconds followed by a lower voltage during the rest of the pressure reapply portion of a brake cycle. Simultaneously, the applied voltage would be removed from the motor and the open circuit back electromotive force (EMF) of the motor is monitored.

The initial high voltage that is applied to the clutch speeds up the magnetic flux buildup of the clutch and provides a torque that is several times greater than the motor torque to be applied to the mechanism. This gives a very high acceleration and a fast response of the mechanism. The kinetic energy in the rotating armature and clutch flywheel mass is converted to a fast pressure rise to a pressure level that is a function of the initial stored energy level. The initial high voltage is applied to the clutch for about 10 ms. The subsequent lower voltage level applied to the clutch allows slightly faster collapse of its magnetic field and release of the clutch later in the antilock cycle when the pressure again has to be dumped. It also allows the clutch to act as an overload device to limit shock loads if the mechanism hits a stop at the limits of its travel.

Figure 7:
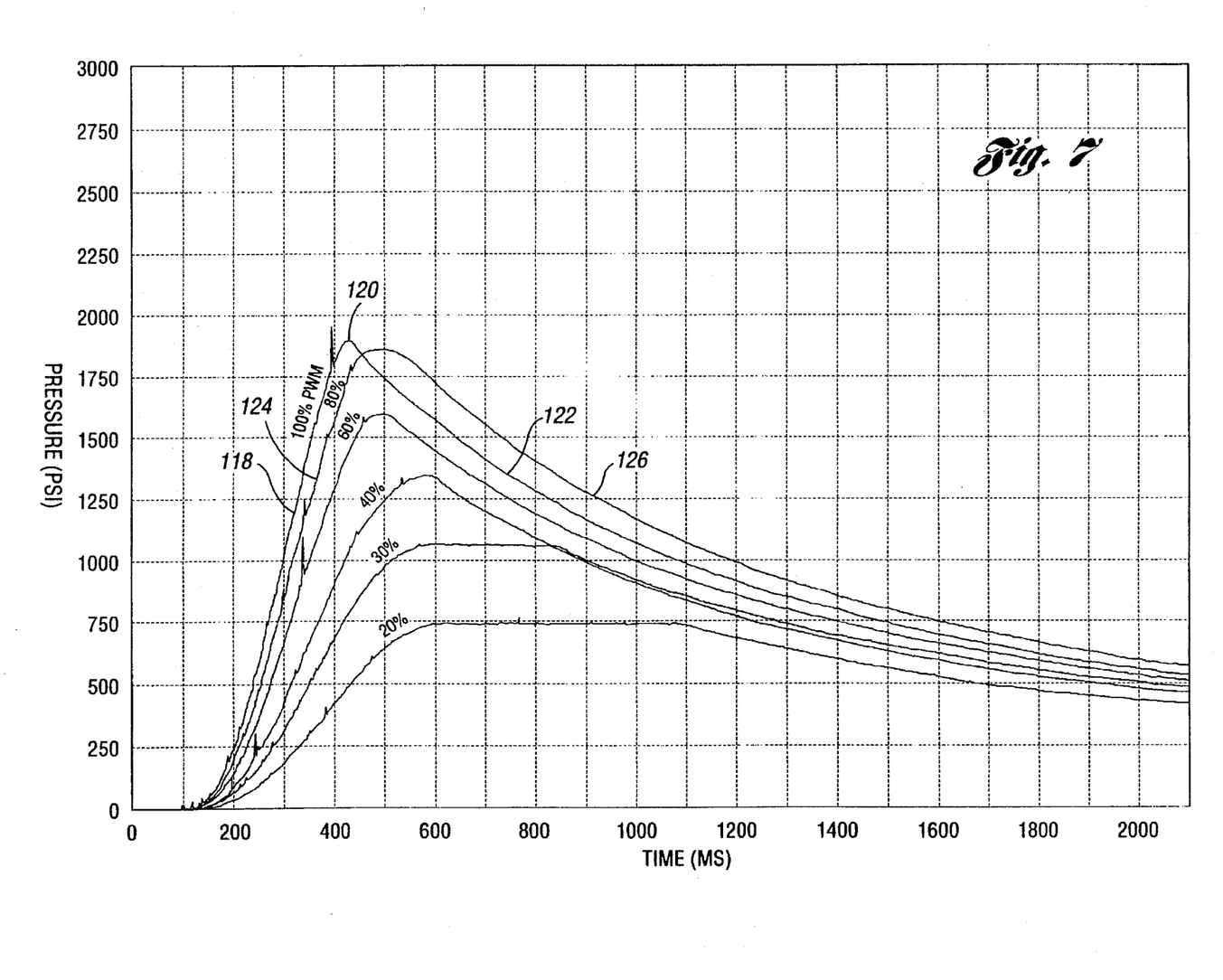

The relationship between the pressure build-up rates and the maximum pressures at the brakes versus the time following the instant the clutch is engaged is illustrated in FIG. 7. At the beginning of the pressure buildup, the kinetic energy of the rotating armature and clutch assembly results in a fast pressure rise as shown at 118. The speed of the armature decreases as the kinetic energy is consumed until it reaches a maximum value at 120. The motor then would reverse direction and the piston, driven by the brake pressure, would back drive the motor through the ball screw mechanism thereby decreasing the pressure in the brakes in accordance with the asymptotic relationship indicated at 122 if a voltage were not then applied to the motor.

The characteristics indicated in FIG. 7 are merely an indication of the functioning of the power cylinder assembly for test or calibration purposes. The data of FIG. 7 is obtained for the power cylinder assembly with a representative brake load connected to it. The fast rise shown at 118 is a result of the kinetic energy stored in the rotating armature when the clutch was disengaged and the motor was driven with a 100% pulse width modulated voltage. The voltage source is the vehicle electrical system (12 volts). If the motor is driven during the period of disengagement of the clutch with an 80% pulse width modulated voltage, a slightly slower pressure buildup rate and lower maximum pressure would be established following reapplication of the clutch as indicated at 124. This would be followed then by an asymptotic decrease in pressure with respect to time as indicated at 126. For reference purposes, other pulse width modulated curves are indicated also in FIG. 7 for various other values of the pulse width modulated motor voltage. These show that a wide and useful range of maximum pressures verses no load motor voltages is obtained.

Figure 6A:
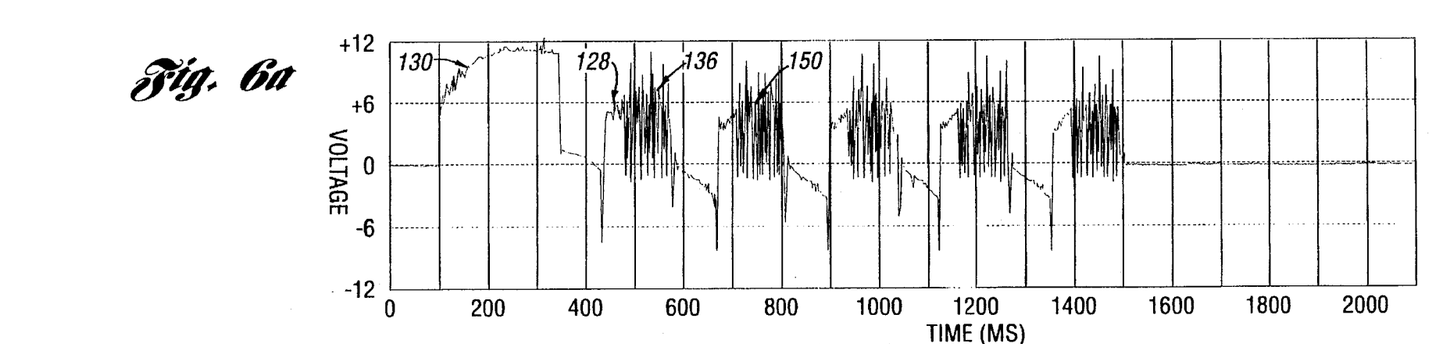
FIG. 6a is a test trace showing (i) reverse electromotive voltage developed by the motor of the system of FIG. 4a during pressure dumping if a clutch were not used, and (ii) the applied PWM voltage needed to achieve a desired slow pressure rise rate during the slow pressure rise portion of the antilock braking cycle when the clutch is engaged.
Figure 6B:
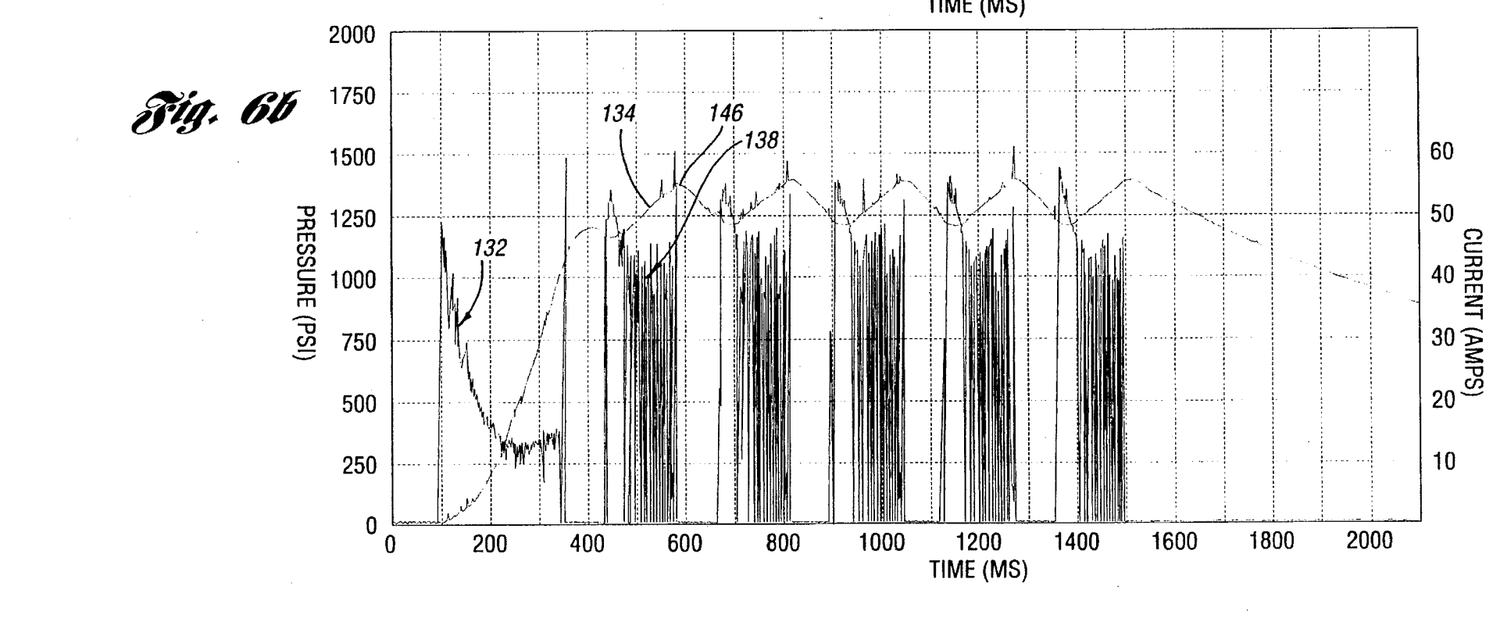
Figure 6C:
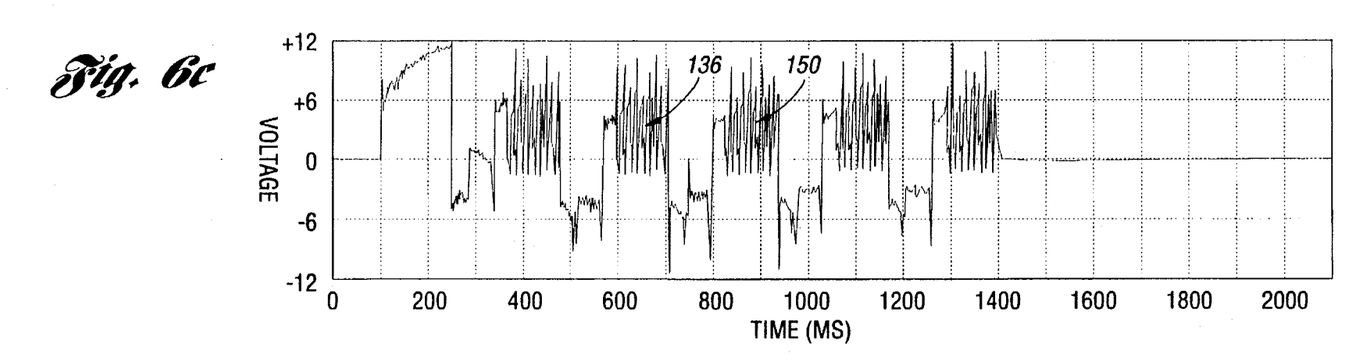
FIG. 6c is a test trace corresponding to FIG. 6a showing (i) reverse electromotive voltage developed by the motor of the system of FIG. 4a during pressure dumping at low maximum brake pressures compared to brake pressures indicated in FIG. 6a if a clutch were not used, and (ii) the applied PWM voltage needed to achieve a desired slow pressure rise rate during the antilock braking cycle when the clutch is engaged.

As the kinetic energy of the armature is consumed when the power cylinder functions as part of an antilock brake system, pressure builds up at the wheel brakes following engagement of the clutch and the motor slows down. During the fast reapply mode, the motor was kept in an open circuit mode. The electromotive force voltage of the motor will be proportional to rate of pressure increase. The back emf voltage is monitored during the fast reapply mode. The pressure increase rate will decrease, as the curves of FIG. 7 indicate. When the open circuit motor voltage indicates that the pressure rise rate decreases to approximately 1500 psi to 2500 psi per second, a voltage would be applied to the motor to maintain the pressure rise rate at about 1500 psi to 2500 psi per second depending on the maximum fast reapply pressure previously used. At lower pressures, i.e., about 500 psi, a lower slow pressure rise rate, e.g., about 1500 psi per second, would be used. At higher pressures, e.g., approximately 2000 psi, a higher slow pressure rise rate of about 2500 psi per second would be used. This characteristic is shown in FIGS. 6c and 6b and 6d. As seen in FIG. 6a, a duty cycled voltage 136 is applied to the motor to give the desired slow pressure rise rate, shown in FIG. 6b, at 134 (e.g., approximately 2500 per second).

During the "off" portion of the duty cycle, motor open circuit back EMF voltage is monitored to determine if the desired motor speed and the desired resulting slow pressure rise rates are occurring. If not, the motor voltage during the "on" portion of the duty cycle is incremented longer or shorter, as required.

FIG. 6d shows slow pressure rise rates as in FIG. 6b but the pressures are lower and the rise rate is less (e.g., approximately 1500 psi per second). A lower voltage duty cycle is used in this case to give a lower slow pressure rise rate, which is desired in the lower pressure operating condition.

The characteristic demonstrated in FIGS. 6b and 6d are very unlike the pressure pulse shapes that would be obtained with a conventional antilock brake system where the brake pressures would be dumped through an orifice. In a conventional system, the pressure rise rate in the slow pressure reapply mode at low maximum pressures would be increased. If the conventional system were to be calibrated to provide a desirable pressure rise rate in the slow pressure reapply mode with low maximum pressures, then the pressure rise rate in the slow reapply mode at high pressures would change in the appropriate direction resulting in less desirable braking performance.

The rate of change in the motor speed is proportional to the moment on the motor which, in turn, is a function of the pressure at the wheels brakes which, in turn, is a function of the closed circuit voltage needed to drive the motor. Thus, by dividing the incremental change in the motor open circuit voltage at the end of the last proportional fast reapply portion of the antilock brake cycle by the time increment and multiplying that quotient by the physical parameter constants of the system, both the brake pressure at that point and the voltage needed to drive the motor against that pressure at the desired speed can be determined and applied. Thus, during the portion of the antilock cycle when the motor has an open circuit with a pressure load, the moment on the motor can be expressed as a function of the motor angular acceleration. This is demonstrated as follows:

$$\Sigma M = I[|\$|]\$\ddot{g}\ddot{v} = I d\theta | dt$$

$$M = I \frac{\Delta \dot{\theta}}{\Delta t}$$

$$M = K_2 P$$

$$\dot{\theta} = K_4 V$$

Therefore, $$P = \left( \frac{k_4}{k_2} \right) (I) \frac{\Delta V_{open}}{\Delta t}$$

and $$M = k_4 I \frac{\Delta V_{open}}{\Delta t},$$

where:
 M=moment
 $M_s$=mtr. stall torque at design voltage
 t=time
 $\dot{\theta}_{NL}$=no-load mtr. speed at design voltage
 $\dot{\theta}_{2500}$=mtr. speed for 2500 psi/sec
 [|\$|]\$¨g¨v=mtr. angular accel.
 $V_{open}$=mtr. open circuit voltage
 $V_{closed}$=mtr. closed circuit applied voltage
 $V_{des}$=mtr. design voltage When a voltage is applied to the motor to maintain the desired rate of change of pressure, the motor angular acceleration can be expressed as follows:

$$\ddot{\theta} = -\left( \frac{\dot{\theta}_{NL}}{M_s} \right) M + (\dot{\theta}_{NL}) \frac{V_{closed}}{V_{des}}$$

$$\ddot{\theta}_{2500} = -\left( \frac{\dot{\theta}_{NL}}{M_s} \right) k_4 I \frac{\Delta V_{open}}{\Delta T} + \left( \frac{\dot{\theta}_{NL}}{V_{des}} \right) V_{closed}$$

$$V_{closed} = \left( \frac{\dot{\theta}_{2500}}{\dot{\theta}_{NL}} \right) V_{des} + \left( \frac{V_{des}}{M_s} \right) k_4 I \frac{\Delta V_{open}}{\Delta t}$$

$$k_5 = \left( \frac{\dot{\theta}_{2500}}{\dot{\theta}_{NL}} \right) V_{des}$$

$$k_6 = \left( \frac{V_{des}}{M_s} \right) I k_4$$

$$V_{closed} = k_5 + k_6 \frac{\Delta V_{open}}{\Delta t}$$

It is seen from the foregoing that the applied voltage for the motor is a function of the physical parameter constants for the particular system involved, the open circuit voltage for the motor and the closed circuit voltage for the motor.

The brake pressure and the load on the motor increases linearly during the slow reapply mode, as shown at 134 in FIG. 6b. The motor voltage during this portion of the antilock brake cycle would be linearly increased to maintain the target pressure rise rate. The slope of the linear voltage increase is a function of the slope of the displacement versus pressure curves for the vehicle, as indicated in FIG. 9. FIGS. 6a and 6b are actual pressure, current and voltage traces during the slow reapply mode for a preferred embodiment of the invention.

Figure 10:
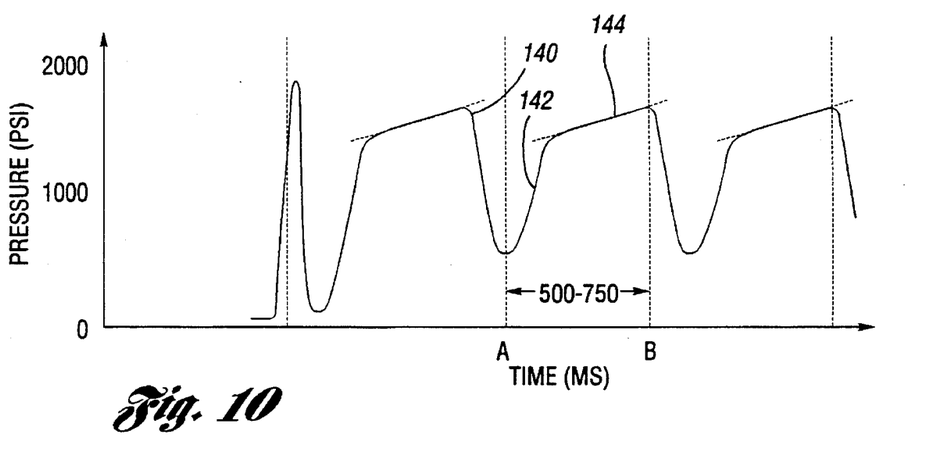
FIG. 10 is a plot indicating the relationship between brake pressure and time during a complete antilock brake cycle of the improved system of the invention.

FIG. 10 shows a diagrammatic plot of the pressure versus time relationship for the improved antilock brake system. As indicated in FIG. 10, the antilock brake system provides a fast dump rate at 140 followed by a fast pressure rise rate at 142 to a proportional pressure followed by a slow pressure rise rate at 144. This slow pressure rise rate at 144 is proportional to the previous proportional fast rate maximum pressure level, which is a stored valve in memory. This sequence repeats as needed.

The pressure at 144 increases at a relatively slower rate but at a high average value, thereby making it possible to maintain a desired short stopping distance. Since a majority of the time for each cycle is spent on the stable side of the percent slip curve, which is illustrated in FIG. 3, good wheel control stability, vehicle lateral stability and steerability are maintained. There will not be an excursion of the friction braking coefficients and the lateral friction coefficient into the region of FIG. 3 to the right of the zone that is designated as the target slip percentage in FIG. 3. This results in a slower cycle rate. Power consumption, furthermore, is reduced compared to a conventional antilock brake system because overshoot in both pressure apply mode and dump mode are reduced, the cycle rates are much slower and power is applied both during dump and at lower pressure levels during the long, slow reapply mode. Also, because of the much lower system cycling frequency, the system cycles well below vehicle suspension system resonance frequencies.

If a dump cycle is triggered when the reapply portion of the antilock cycle has lasted from approximately 500 to 750 milliseconds, as indicated in FIG. 10, the system responds as intended with the PWM memory voltage and the energy storage of the preceding cycle. As discussed earlier, that memory voltage is a voltage that causes the motor and input clutch masses to rotate and to store enough kinetic energy to produce a brake pressure of approximately 80% of lockup pressure. Therefore, there will be no need to change the motor memory voltage and that voltage would be used during the next cycle. If, on the other hand, the reapply portion of the antilock cycle extends past the 750 millisecond limit indicated in FIG. 10, the vehicle may have moved to a surface with a higher friction coefficient or the memory voltage of the previous cycle may have been too low. Therefore, after approximately 750 milliseconds, the motor voltage that is maintained during the slow reapply mode would be increased to rapidly increase the brake pressure. The motor memory voltage would be incremented by a fixed amount and that new memory voltage would be used on a subsequent antilock brake cycle.

If a dump cycle is received when the reapply portion of the antilock cycle has lasted from approximately 250 milliseconds to 500 milliseconds, the cycle is shorter than intended. The motor memory voltage then would be decremented by a fixed amount and this new memory voltage would be used on the subsequent cycle. If a dump cycle is triggered when the slow reapply mode has lasted less than approximately 250 milliseconds, the cycle would be much shorter than intended. The motor memory voltage then would be decremented by double the fixed amount and the new memory voltage then would be used on the next antilock brake cycle. If the vehicle brake are released by the driver by removing brake pedal force, and if the driver has not reapplied the brakes during a period of about 250 ms, the motor memory voltage is reset to its initial value.

Figure 8:
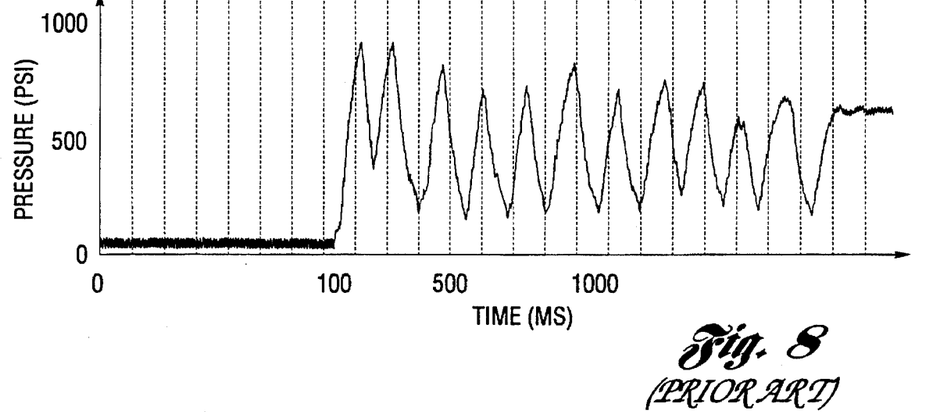
FIG. 8 is a plot showing the pressure force at the wheel brakes versus time during an antilock brake cycle of a conventional antilock brake system that does not include the improvements of the present invention.

In order to compare the performance of the improved antilock brake system of this invention with the performance of prior art antilock brake systems, reference may be made to FIG. 8 where brake pressure versus time for a conventional system is plotted. As seen in FIG. 8, brake pressure has multiple peaks which occur at a relatively high frequency compared to the slower cycle rate illustrated in FIG. 10. A conventional system, which would perform in accordance with FIG. 8, has no control based on brake pressure levels and brake pressure increase rates at the brakes. Further, it would not use feedback information on pressure levels and rates that are available with the system of the present invention.

The present embodiment of the invention calls for monitoring the back EMF voltage during the off portion of the pulse width modulated voltage that is applied to the motor to maintain the desired buildup rate during the slow reapply portion of the antilock cycle as seen at 144 in FIG. 10 and at 134 in FIG. 6b. That is, the back EMF of the motor would be measured and monitored between voltage pulses of the pulse width modulated motor-driving voltage.

Various modifications of the antilock brake system embodiment described in this specification may be made by persons skilled in this art without departing from the scope of the invention as defined by the following claims.

What I claim and desire to secure by U.S. Letters Patent is:

1. An antilock brake system for a wheeled vehicle having wheel brakes and a driver actuated master brake cylinder, wheel speed sensor means for detecting wheel speeds, an electronic controller means for detecting an incipient wheel lockup in response to wheel speeds detected by said wheel speed sensor means, said controller means including memory registers for storing motor voltage during operation of said antilock brake system and a brake pressure distribution circuit connecting said master brake cylinder and said wheel brakes;

a power cylinder assembly having a brake pressure piston, an electric motor means for powering said piston and a selectively engageable clutch means for drivably connecting said motor means to said piston;

a solenoid-operated valve means in said pressure distribution circuit having a first state in which said master cylinder is connected to said wheel brakes and a second state in which said master cylinder is isolated from said wheel brakes, said power cylinder assembly being connected to said wheel brakes when said valve assembly assumes said second state;

means for applying a controlled memory voltage to said motor means when said clutch means is disengaged to accelerate rotary portions thereof, thereby storing rotary inertia energy when said valve means is in said second state;

means for interrupting voltage applied to said motor means and for simultaneously disengaging said clutch means to effect a dumping of pressure in successive cycles from said wheel brakes to said power cylinder assembly as said brake pressure back-drives said piston;

means for reapplying said clutch means to effect a first rate of pressure buildup;

means for monitoring back EMF voltage of said motor means following said dumping of pressure from said wheel brakes as pressure builds up at said first rate upon re-engagement of said clutch means and as said inertia energy is converted to a brake pressure increase, said monitoring means including means for detecting a predetermined voltage value that is a function of said memory voltage; and means for establishing, when said predetermined voltage value is detected, a modified rate of pressure buildup, slower than said first rate, at said wheel brakes by applying a voltage to said motor means to effect said modified rate of wheel brake pressure buildup, whereby brake cycle time is increased and vehicle stopping distance is reduced as effective wheel brake pressure levels are increased.

2. The antilock brake system as set forth in claim 1 wherein said electronic controller means includes means for measuring cycle time of a pressure buildup at said wheel brakes following said dumping of pressure from said wheel brakes to an instant when incipient wheel lockup is detected by said wheel speed sensor means, and means for incrementing said voltage applied to said motor means to a calibrated value when said cycle time exceeds a predetermined value.

3. The antilock brake system as set forth in claim 1 wherein said electronic controller means includes means for measuring cycle time of a pressure buildup at said wheel brakes following said dumping of pressure from said wheel brakes to an instant when incipient wheel lockup is detected by said wheel speed sensor means, and means for decrementing said voltage applied to said motor means to a calibrated value when said cycle time is less than a predetermined value.

4. The antilock brake system as set forth in claim 1 wherein the maximum value of said voltage applied to said motor means is a predetermined value less than the voltage that would develop incipient lockup of said wheel brakes.

5. The antilock brake system as set forth in claim 2 wherein the maximum value of said voltage applied to said motor means is a predetermined value less than the voltage that would develop incipient lockup of said wheel brakes.

6. The antilock brake system as set forth in claim 3 wherein the maximum value of said voltage applied to said motor means is a predetermined value less than the voltage that would develop incipient lockup of said wheel brakes.

7. The antilock brake system as set forth in claim 1 wherein said voltage applied to said motor means is a duty cycle motor voltage, the magnitude of the energy stored in said motor means in a unit time being determined by voltage duty cycle.

8. The antilock brake system as set forth in claim 7 wherein said means for establishing said modified rate of pressure buildup comprises means monitoring duty cycle time of said voltage duty cycle and for adjusting said duty cycle to maintain said modified rate of pressure buildup.

9. The antilock brake system as set forth in claim 1 wherein said clutch means is an electromagnetic clutch; and means for engaging said clutch means by applying a high voltage thereto upon initial engagement and for applying a reduced voltage thereto after a predetermined initial engagement time whereby capacity of said clutch means is higher at initial engagement than during subsequent engagement.

10. The antilock brake system of claim 2 wherein said incrementing means includes means for incrementing said voltage applied to said motor means to a predetermined voltage greater than said calibrated value when said cycle time exceeds said predetermined value by a given amount.

11. The antilock brake system of claim 3 wherein said decrementing means includes means for decrementing said voltage applied to said motor means to a predetermined voltage greater than said calibrated value when said cycle time exceeds said predetermined value by a given amount.

12. The antilock brake system as set forth in claim 1 wherein said means for applying a controlled voltage to said motor means comprises a timer means for measuring the elapsed time between successive wheel brake applications; and means for resetting said voltage applied to said motor means to a value equal to said controlled memory voltage when said elapsed time exceeds a predetermined value.

* * * * *

UNITED STATES PATENT AND TRADEMARK OFFICE
CERTIFICATE OF CORRECTION

PATENT NO. : 5,468,058
DATED : November 21, 1995
INVENTOR(S) : Herbert L. Linkner, Jr.

It is certified that error appears in the above-indentified patent and that said Letters Patent is hereby corrected as shown below:

Column 7, Line 30, delete "row".

Column 7, Line 31, delete "row".

Column 9, Line 56, delete $$\sum M = I[|\$]\$\ddot{}\,g\ddot{v} = Id\,\theta|dt$$

and insert $$\sum M - I\,\theta = Id\,\theta/dt$$

Column 9, Line 57, delete "row".

Column 9, line 58, delete "row".

Column 10, line 17, delete $$[|\$]\$\ddot{}\,g\ddot{v}$$ and insert $\theta$

Signed and Sealed this

Eleventh Day of June, 1996

Attest:

BRUCE LEHMAN

Attesting Officer     Commissioner of Patents and Trademarks